United States Patent [19]

Solomon et al.

[11] Patent Number: 4,948,860

[45] Date of Patent: Aug. 14, 1990

[54] MELT PROCESSABLE POLYURETHANEUREA COPOLYMERS AND METHOD FOR THEIR PREPARATION

[75] Inventors: Donald D. Solomon, Spring Valley, Calif.; Anthony J. Walder, Dayton, Ohio; Can B. Hu, Frountain Valley, Calif.

[73] Assignee: Becton, Dickinson and Company, Franklin Lakes, N.J.

[21] Appl. No.: 345,800

[22] Filed: May 1, 1989

[51] Int. Cl.$^5$ .............................................. C08G 18/32
[52] U.S. Cl. ...................................... 528/28; 528/76; 528/83; 528/84
[58] Field of Search ........................ 528/28, 76, 83, 84

[56] References Cited

U.S. PATENT DOCUMENTS 3,642,064  2/1972  Rausch et al. ...................... 264/40

Primary Examiner—Maurice J. Welsh
Attorney, Agent, or Firm—Richard E. Brown

[57] ABSTRACT

Melt processable polyurethaneureas are prepared from a diisocyanate, a macroglycol, a diol chain extender and a diamine chain extender. Water may be included as a reactant, and the polymer may contain an additive such as a radiopaque material. The invention includes a one-pot bulk polymerization method for preparation of the polymers.

20 Claims, No Drawings

MELT PROCESSABLE POLYURETHANEUREA COPOLYMERS AND METHOD FOR THEIR PREPARATION

BACKGROUND OF THE INVENTION

1. Field of the Invention

This invention relates to copolymers, and more specifically relates to polyurethaneureas which may be extruded and molded in melt form and a method for their preparation.

2. Background of the Invention

Polyurethane block copolymers possess an outstanding balance of physical and mechanical properties and superior blood compatibility compared to other polymers such as silicone rubber, polyethylene, polyvinyl chloride and perfluorinated polymers. As a result, they have come to the fore as the preferred polymeric biomaterials for fabrication of various medical device components. Some important device applications for polyurethanes include peripheral and central venous catheters, coatings for heart pacemaker leads and the Jarvik heart.

Polyurethanes are synthesized from three basic components, a polyisocyanate, a macroglycol and an extender, usually a low molecular weight diol, diamine, aminoalcohol or water. If the extender is a diol, the polyurethane consists entirely of urethane linkages. If the extender is water, aminoalcohol or a diamine, both urethane and urea linkages are present and the polyurethane is more accurately and conventionally termed a polyurethaneurea. In this disclosure, polyurethaneurea will hereinafter be abbreviated as PUU.

Polyurethanes develop microdomains conventionally termed hard segments and soft segments, and as a result are often referred to as segmented polyurethanes. The hard segments form by localization of the portions of the polymer molecules which include the isocyanate and extender components and are generally of high crystallinity. The soft segments form from the polyether glycol portions of the polymer chains and generally are either noncrystalline or of low crystallinity. One of the factors which determines the properties of the copolymer is the ratio of hard and soft segments.

Exemplary of important diol extended polyurethanes are: Vialon ® (Becton Dickinson Polymer Research), Pellethane ® (Dow Chemical Co.,) and Tecoflex ® (Thermedics Inc.). These products typically have good blood compatibility, but, with the exception of Vialon ®, generally require processing additives such as antioxidants and detackifiers, a potential disadvantage for use in biomedical articles. They are, however, thermoplastic and therefore may be melt extruded and injection molded.

Diol extended thermoplastic polyurethanes are conventionally manufactured by operationally simple and economical bulk or one shot polymerization processes wherein all the ingredients are combined, mixed and reacted. PUUs, although commercially prepared by a two step procedure, described below, have also been prepared by a one shot continuous process using a catalyst (U.S. Pat. No. 3,642,964 to Rausch et al.). The catalyst, because is is generally inherently toxic, cannot be present in PUUs to be fabricated into biomedical articles.

The conventional two step preparation of PUUs is generally carried out by reacting the isocyanate and macroglycol in a solvent to give a prepolymer followed by chain extension with the diamine or aminoalcohol. Exemplary of the two step procedure is the disclosure of Gilding et al. in U.S. Pat. No. 4,062,834.

Several disadvantages are encountered in the two-step process. First, the process generally requires a solvent, usually toxic dimethylacetamide (DMAC). Second, as pointed out by Ward et al. (*Polyurethanes in Biomedical Engineering*, H. Planck, G. Egbers and I. Syre, ed., Elsevier Science Publishers B.V., Amsterdam, 1984) even reagent grade solvents contain enough water as an impurity to hydrolyze a significant portion of the isocyanate groups to amine groups which react with other isocyanate residues to form urea linkages of different structures than those obtained from the diamine extender. The resulting mixed hard segments complicate the structure of the polymers and increase the likelihood of batch to batch variations in properties.

A PUU well-known as an industrial fiber (Lycra ® DuPont de Nemours and Co.) has been extensively studied under the trade name Biomer ® (Ethicon Corp.) for fabrication of various biomedical devices. A review of these studies and the many salubrious properties of PUU has been presented by Phillips et al., *The Use of Segmented Polyurethane In Ventricular Assist Devices and Artificial Hearts*, in Synthetic Biomedical Polymers, M. Szycher and W. J. Robinson, ed. Technomic Publishing Co., Inc., Westport, Conn., 1980, page 39. However, as stated by Phillips et al., Biomer ® presents some fabrication difficulties that limit production techniques. Biomer ® has a melt temperature higher than the decomposition temperature of the urethane functionality and therefore can be spun or cast only from solution, i.e., it cannot be melt extruded or injection molded. Severe limitations are thereby imposed on its fabrication latitude. Further, it is essentially insoluble in all solvents except DMAC which of course must be completely removed if the product is to be used in a biomedical article.

Taller et al., in Research Disclosure No. 12,823, December 1974, and Short et al. in U.S. Pat. No. 4,522,986, disclose PUU compositions prepared by the two step prepolymer technique from a diisocyanate, a polyol and monoethanolamine as extender.

Ward et al. (supra) discloses a new PUU formulation for biomedical use consisting of a blend of PUU and an additive surfactant polymer.

There is a need for a bulk polymerization method to prepare melt processable PUU having the desirable properties of both diol extended and diamine extended PUU. The present invention fulfills this need.

SUMMARY OF THE INVENTION

One aspect of the present invention is a melt processable PUU prepared by reaction of a polyisocyanate, a macroglycol, a chain extending diol and a chain extending diamine. Preferred PUUs are prepared from a diisocyanate such as 4,4'-diphenylmethane diisocyanate (MDI) and a polyether glycol, such as polyethylene glycol (PEG) or polytetramethyleneoxide glycol (PTMO). The macroglycol may be wholly or in part a silicone glycol. Preferred diol extenders are ethylene glycol (EG) and 1,4-butanediol (BDO). Preferred diamine extenders are ethylenediamine (EDA) and 2-methylpentamethylene diamine (MPMD). Water may be included in the reaction mixture and, in the form of moist air, may also serve to cure the polymer. The polymer may include various additives, such as a radiopaque agent.

Another aspect of the invention is a method to prepare the PUU of the invention. The preferred method is a one-pot reaction in which all the components are combined with efficient stirring. An exotherm takes place during the polymerization reaction, after which the polymer may be transferred to a tray for spontaneous moisture cure at an appropriate temperature.

Thus the method of the invention provides a low-cost, catalyst-free and solvent-free bulk or one-shot method for preparing melt-processable PUUs. In contrast, the previously disclosed two-step method for preparation of PUUs requires a solvent, requires careful control of various reaction parameters, and provides a PUU which cannot be melt processed and instead must be solution cast or solution extruded. The PUUs of the invention are melt processable over a wide range of hard segments and possess higher tensile properties than PUUs extended with amine or diol only. Medical device components melt extruded from the inventive PUUs exhibit an excellent level of hemocompatibility and show a very low tendency toward tackiness, even when of low hard segment content. In contrast, most low hard segment polyurethanes excluding Vialon ® and polyurethaneureas of the known art contain solvents, catalysts and detackifiers that can leach out of device components with potentially deleterious effect on blood and tissue compatibility.

In addition to having advantages accruing from conventional melt processing and solution coating fabrication techniques, the PUUs of the invention may be developed and expanded into a broad new class of polymeric biomaterials and devices through polymer alloys, chemical modification, grafting, surface coating treatments and co-extrusion. Such material should potentially provide a novel range of physical/mechanical properties, enhanced blood and tissue compatibility as well as selective moisture vapor, gas transmission and controlled release characteristics.

DETAILED DESCRIPTION OF THE INVENTION

While this invention is satisfied by embodiments in many different forms, there will herein be described in detail preferred embodiments of the invention with the understanding that the present disclosure is to be considered as exemplary of the principles of the invention and is not intended to limit the invention to the embodiments described. The scope of the invention will be measured by the appended claims and their equivalents.

In accordance with the method of the present invention, PUUs which may be processed by melt techniques such as extrusion and insert and injection molding are synthesized by a simple reproducible one-pot bulk polymerization procedure without a solvent or catalyst. The method may be applied to any formulation which includes polyisocyanates and macroglycols polymerized and chain extended with a combination of a diol and a diamine, and optionally with water. The novel polymers of the invention may be used in a number of applications requiring soft, elastomeric, blood compatible, and tissue compatible polymers. For example, they have excellent applicability in virtually all central venous access catheter products, urinary catheters, vascular grafts, long term implantable catheters, as coatings or components of other implantable devices, elastomeric gloves, and condoms. These polymers are also useful for products requiring a harder material such as hemodialysis catheters, introducer catheters, obturators, and peripheral catheters.

Polyisocyanates useful in the present invention may have two or more isocyanate groups. Preferred polyisocyanates are aromatic or alicyclic diisocyanates, such as MDI, toluene diisocyanate, isophorone diisocyanate, methylene bis (4-cyclohexyl isocyanate), hexamethylene diisocyanate and the like. Of these, MDI is preferred.

Useful macroglycols are polyester glycols, polylactone glycols and polyether glycols. These macroglycols are well-known in the art and many are commercially available. Preferred macroglycols are polyethers having a molecule weight of about 500 to 8,000. A preferred polyether is PEG. The most preferred polyether is PTMO having a molecular weight of about 500 to 3,000, preferably about 1,000 to 2,000. These products are available commercially under the trade names Polymeg ® (Quaker Oats Co., Chemical Division) and Terathane ® (DuPont), respectively.

Another class of useful macroglycols is the silicone glycol class. These products likewise are well-known, and representative examples are described in U.S. Pat. No. 4,647,643 to Zdrahala et al. A particularly useful silicone glycol is commercially available from Dow Corning Corp. under the designation 4-3667 fluid (formerly Q4-3667). This product will hereinafter be referred to as Q-4. Those formulations of the invention which include a silicone glycol may have from 0 to 20% of the total weight of the formulation in the form of the silicone glycol.

The chain extender component of the inventive PUU may include both a low molecular weight branched or unbranched diol and diamine of up to 12 carbon atoms. Representative nonlimiting examples of chain extenders are BDO; EG; diethylene glycol; triethylene glycol; 1,2-propanediol; 1,3-propanediol; 1,6-hexanediol; 1,4-bis-hydroxymethyl cyclohexane, hydroquinone dihydroxyethyl ether, EDA, hexamethylenediamine (HDA), octamethylenediamine (ODA), dodecamethylenediamine (DDA), 1,2-, 1,3- and 1,4-phenylenediamine (PDA) and MPMD (commercially available from DuPont, Wilmington, Del., under the trade name Dytek A ®). The most preferred extenders are BDO, HDA, ODA, DDA and MPMD. The ratio of diol to diamine in the mixture of extenders may be about 1:1,000 to 1,000:1, preferably about 1:10 to 10:1, most preferably about 1:2 to 2:1.

In the PUU of the invention, the diol chain extender provides melt processability and contributes to the strength of the polymer. On the other hand, the diamine extender provides blood compatibility which makes articles fabricated from the PUU of the invention particularly suitable for blood-contacting operations.

The diisocyanate and chain extender make up the hard segment of the PUU composition. Compositions which may be prepared by the method of the invention may have hard segments of from 20 to 75% by weight of the total weight of the formulation. Preferred formulations include hard segments of 27 to 35% by weight.

The ratio of the ingredients which may be reacted in accordance with the method of the invention is based on the reaction of one isocyanate group with one alcohol or amino group from the macroglycol or extenders. Thus, the ratio of the total isocyanate groups in the diisocyanate to the total hydroxyl and amino groups present in both the macroglycol and the extender components is conventionally referred to as the isocyanate index (II) and may be from about 80 to 140, preferably from about 110 to 140, most preferably about 120. The quantities of the ingredients to be mixed may be calculated from the predetermined ratio of desired hard and soft segments and the known equivalent weights of the diisocyanate, macroglycol and diol and diamine extenders. Excess isocyanate groups present in formulations of high II may be reacted with water during the curing step, as described below.

It will be appreciated by one skilled in the art that blocks of both the diol and diamine extenders are present in the polyurethaneurea of the invention. Thus, for example, the PUU may have as a representative structure

—MDI—PTMO—MDI—MPMD—MDI—B-
DO—MDI with the understanding that the hyphens represent covalent bonds formed between the indicated reaction components and that the terminal isocyanate groups are hydrolyzed by chain extending water in the formulation or preferably during a moisture cure to amino groups which may react with other isocyanate groups to give blocks of additional hard segment.

In conventional bulk or one-shot or one-step polymerization processes, all of the ingredients are combined at the beginning of the process and subjected, usually with stirring, to a polymerization catalyst. The present inventors have discovered, in contrast to the prior art, that PUUs which are melt processable may be obtained by a simple one-pot procedure without catalyst or solvent when the chain is extended with a mixture of a diol and a diamine. Conventional catalysts in the art, for example, organometallic compounds such as dibutyl tin dilaurate, are toxic and leachable and may cause deletrious effects in blood-contacting elements fabricated from prior art catalyst-containing PUU. By avoiding use of a catalyst, PUUs of the invention are purer and potentially less toxic than those of the prior art and are suitable for fabrication of biomedical devices.

In one preferred process of the invention, conventional polymerization equipment is charged with a mixture of the macroglycol and extenders in proportions predetermined in accordance with the desired hard segment-soft segment ratio. With vigorous stirring, the diisocyanate may be added all at once. If the reaction does not start spontaneously, the mixture may be heated sufficiently to induce an exothermic reaction. The reaction mixture may be stirred vigorously until the exotherm is complete and the temperature begins to drop off, generally for about 1 to 5 minutes. The clear homogeneous melt, while still hot, may advantageously be removed from the reactor prior to curing.

In an alternative procedure, the macroglycol and diisocyanate may be mixed with stirring, and, when the initial exotherm begins to subside, the extender mixture may be added with continued stirring. In some cases, it may be advantageous to add the extenders sequentially. Preferably, the diol may be added all at once or in portions, and the diamine added last.

The reaction may be carried out for about 1 second to 10 minutes, preferably about 15 seconds to 5 minutes, most preferably for about 1 to 2 minutes. In general, the exotherm reaches about 100° C. before subsiding.

Any conventional method may be used to effect curing. Preferably, the melt is simply set aside for a suitable time and temperature, as, for example, from ambient to about 60° C. and for about 1 hour to 20 days, to be cured by atmospheric moisture.

Any polymerization equipment or technique which provides a clear melt at the conclusion of the exotherm is contemplated to fall within the scope of the invention. Preferred equipment includes a multi-paddle shaft driven at high rotation rate by a motor. Exemplary of such a system is the Fluidyne Model 63014 Microshot Elastomer Processing System.

The polyurethane resins of the invention may be fabricated into film, tubing and other forms by conventional thermoplastic fabricating techniques including melt casting, extrusion molding, etc. The resin may have incorporated therein, as desired, conventional stabilizers, radiopaque materials such as barium sulfate, and the like. The amounts of these materials will vary depending upon the application of the polyurethane, but they are typically present in amounts ranging from about 25 to 40 weight percent of the polymer.

Tensile strength is a measure of the force, generally given in pounds per square inch (psi) required to break a polymer. Elongation is a measure of the ability of a polymer to stretch without breaking, and is generally reported as a percentage of an initial value. The term modulus defines the force, in psi, required to stretch a polymer to a given percentage of elongation.

The tensile, elongation and modulus of the PUU of the invention may be measured by ASTM procedure D638 using an Instron Universal Testing Instrument, Model 1122. Representative polymers of the invention are given, along with their physical properties, hard segment (HS) content and isocyanate index (II), in the Charts below.

The following Examples are provided to further describe the invention but are not to be considered in any way to be limitative of the invention.

EXAMPLE I

One Step Bulk Polymerization

PTMO 1000 (350 g) was mixed with 4.96 g each of MPMD and ethylene glycol. With rapid stirring, 140.1 g of MDI was added all at once. The mixture was stirred for three minutes while the temperature rose to 100° C. The clear hot melt was spread on a tray and cured in an oven at 125° C. for one hour, then allowed to post cure in moist air at ambient temperature for two days.

EXAMPLE II

Two Step Bulk Polymerization

PTMO 1000 (350 g) was reacted with rapid stirring with 141.7 g MDI to form a prepolymer. To the prepolymer was added with rapid stirring 4.15 g each of MPMD and BDO and the mixture stirred for an additional three minutes. The resulting polymer was spread on a tray and cured in a 125° C. oven for one hour. The polymer slab was allowed to post cure in moist air.

EXAMPLE III

Three Step Bulk Polymerization

PTMO 1000 (350 g) was reacted with 141.7 g MDI with rapid stirring for three minutes to form a prepolymer. To the prepolymer, 4.15 g of BDO was added with rapid stirring for three minutes followed by of MPMD with rapid stirring to complete the reaction. The resulting polymer was spread on a tray and cured in a 125° C. oven for one hour. The polymer slab was allowed to post cure in moist air.

EXAMPLE IV

One Shot Bulk Polymerization

PTMO 1000 (350 g) was mixed with 1.66 g of water and 5.55 g each of MPMD and BDO. MDI (138.9 g) was added all at once with rapid stirring, and stirring continued for two minutes. The resulting polymer was spread on a tray and cured in a 125° C. oven for one hour. The polymer slab was allowed to post cure under ambient conditions.

EXAMPLE V

One Step Bulk Polymerization

A mixture of PTMO 1000 (332.5 g), 17.5 g of Q-4 2000, and 4.49 g each of MPMD and BDO was reacted with rapid stirring with 141.0 g of MDI for two minutes. The resulting polymer was spread on a tray and cured in a 125° C. oven for one hour. The polymer slab was allowed to post cure in moist air.

EXAMPLE VI

One Shot Bulk Polymerization

PTMO 1000 (350 g) was mixed with 125 g of barium sulfate. Water (1.48 g) and 2.92 g each of MPMD and BDO were added and the mixture treated all at once with 141.0 g of MDI with rapid stirring. After stirring for two minutes, the resulting polymer was spread on a tray and cured in a 125° C. oven for one hour. The polymer slab was allowed to post cure in moist air.

EXAMPLE VII

One Shot Bulk Polymerization

PTMO 1000 (350 g) was mixed thoroughly with 125 g of barium sulfate. Q-4-2000 (17.5 g), 1.48 g of water and 4.49 g each of MPMD and BDO were added, followed by 141.0 g MDI added all at once with rapid stirring. After stirring for two minutes, the resulting polymer was spread on a tray and cured in a 125° C. oven for one hour. The polymer slab was allowed to post cure under ambient conditions.

The polymers in the following chart are representative of the polymers of the invention and were prepared by the method of Examples I–VII using an II of 120.

| NO. | GLYCOL-MW | WT (g) | DIOL | WT (g) | DIAMINE | WT (g) | MDI | HS, % | TENSILE psi | MODULUS psi at 5% | ELONGATION % |
|---|---|---|---|---|---|---|---|---|---|---|---|
| 1 | PTMO-650 | 350 | BDO | 3.13 | MPMD | 3.13 | 168.7 | 33 | | | |
| 2 | PTMO-1000 | 375 | BDO | 1.38 | MPMD | 1.38 | 122.2 | 25 | | | |
| 3 | PTMO-2000 | 350 | BDO | 12.58 | MPMD | 12.58 | 124.8 | 30 | 5410 | 320 | 1140 |
| 4 | PTMO-2900 | 375 | BDO | 11.04 | MPMD | 11.04 | 102.9 | 25 | | | |
| 5 | PEG-600 | 325 | BDO | 1.57 | MPMD | 1.57 | 172.0 | 35 | | | |
| 6 | PEG-1450 | 350 | BDO | 9.65 | MPMD | 9.65 | 130.7 | 30 | | | |
| 7 | PEG-3550 | 375 | BDO | 11.65 | MPMD | 11.58 | 101.8 | 25 | | | |
| 8 | PEG-8000 | 350 | BDO | 17.65 | MPMD | 17.79 | 114.4 | 30 | | | |
| 9 | PTMO-1000 | 350 | BDO | 4.29 | EDA | 4.29 | 141.4 | 30 | 907 | 125 | 878 |
| 10 | PTMO-1000 | 350 | BDO | 5.48 | HDA | 5.48 | 139. | 30 | | | |
| 11 | PTMO-1000 | 350 | BDO | 6.02 | ODA | 6.02 | 137.9 | 30 | 4176 | 279 | 518 |
| 12 | PTMO-1000 | 350 | BDO | 7.00 | DDA | 7.00 | 136.0 | 30 | | | |
| 13 | PTMO-1000 | 350 | BDO | 7.92 | MPMD | 2.64 | 139.4 | 30 | 4723 | 315 | 580 |
| 14 | PTMO-1000 | 350 | BDO | 2.91 | MPMD | 8.70 | 138.4 | 30 | 2974 | 315 | 580 |
| 15 | PTMO-1000 | 350 | BDO | 5.38 | 1,2-PDA | 5.38 | 139.2 | 30 | 4644 | 379 | 650 |
| 16 | PTMO-1000 | 350 | BDO | 5.38 | 1,3-PDA | 5.38 | 139.2 | 30 | 4745 | 289 | 685 |
| 17 | PTMO-1000 | 350 | BDO | 5.38 | 1,4-PDA | 5.38 | 139.2 | 30 | 1735 | 277 | 1025 |
| 18 | PTMO-1000 | 350 | EG | 7.22 | MPMD | 7.22 | 135.8 | 30 | 231 | 59 | 1500 |
| 19 | PTMO-1000 | 350 | EG | 6.39 | MPMD | 2.13 | 139.4 | 30 | 4918 | 308 | 593 |
| 20 | PTMO-1000 | 350 | EG | 2.73 | MPMD | 8.20 | 139.0 | 30 | 4589 | 386 | 570 |
| 21 | PTMO-1000 | 350 | BDO | 8.55 | MPMD | 8.55 | 132.9 | 30 | | | |
| 22 | PTMO-1000 | 375 | BDO | 1.38 | MPMD | 1.38 | 122.2 | 25 | | | |
| 23 | PTMO-1000 | 300 | BDO | 13.9 | MPMD | 13.9 | 172.8 | 40 | | | |

Thus, the invention includes thermoplastic melt processable PUUs which include diol extender blocks and diamine extender blocks in the polymer chain. The polymers are made by a facile one-pot, one-shot, solvent free, catalyst-free process.

What is claimed is:

1. A method for producing a melt processable polyurethaneurea comprising combining with mixing a diisocyanate and a mixture of a polyetherglycol having a molecular weight of about 500 to 3,000, a diol chain extender and a diamine chain extender at a temperature sufficient to induce an exotherm to give a clear and uniform melt of polyurethaneurea and curing said polyurethaneurea.

2. The method in accordance with claim 1 wherein said combining step is performed with a diisocyanate selected from the group consisting of 4,4'-diphenylmethane diisocyanate, toluene diisocyanate, isophorone diisocyanate and methylene bis (4-cyclohexyl isocyanate), and hexamethylene diisocyanate.

3. The method in accordance with claim 1 wherein said combining step is performed with a polyetherglycol selected from the group consisting of polyethyleneoxide, polypropyleneoxide and polytetramethyleneoxide.

4. The method in accordance with claim 1 wherein said combining step is performed with a diol selected from the group consisting of butanediol, ethylene glycol; diethylene glycol; triethylene glycol; 1,2-propanediol; 1,3-propanediol; 1,6-hexanediol; 1,4-bis-hydroxymethyl cyclohexane and hydroquinone dihydroxyethyl ether.

5. The method in accordance with claim 1 wherein said combining step is performed with a diamine selected from the group consisting of ethylenediamine, hexamethylenediamine octamethylenediamine, dodecamethylenediamine, 1,2-phenylenediamine and 2-methylpentamethylenediamine.

6. The method in accordance with claim 1 wherein said combining step is further performed with a reagent selected from the group consisting of water, a silicone glycol and a radiopaque material.

7. A method for producing a melt processable polyurethaneurea comprising combining with mixing a polyisocyanate, a macroglycol, a diol chain extender and a diamine chain extender at a temperature sufficient to induce an exotherm to give a clear and uniform melt of thermoplastic polyurethaneurea and curing said polyurethaneurea.

8. The method in accordance with claim 7 wherein said combining step is performed with a macroglycol selected from the group consisting of a silicone glycol, a polyester glycol, and polylactone glycol and a polyether glycol.

9. A method for producing a melt processable polyurethaneurea comprising adding 4,4'-diphenylmethane diisocyanate, with mixing, to a mixture of butanediol, 2-methylpentamethylenediamine, water and polytetramethyleneoxide having a molecular weight of about 500 to 3,000 at a temperature sufficient to induce an exotherm to give a clear uniform melt of a polyurethaneurea and moisture curing said polyurethaneurea at ambient temperature.

10. A melt processable polyurethaneurea comprising a product from the reaction of a diisocyanate, a polyetherglycol having a molecular weight of about 500 to 3,000, a diol chain extender and a diamine chain extender.

11. The polyurethaneurea of claim 10 wherein said diisocyanate is selected from the group consisting of 4,4'-diphenylmethane diisocyanate, toluene diisocyanate, isophorone diisocyanate, methylene bis (4-cyclohexyl isocyanate), and hexamethylene diisocyanate.

12. The polyurethaneurea of claim 10 wherein said polyetherglycol is selected from the group consisting of polyethyleneoxide, polypropyleneoxide and polytetramethyleneoxide.

13. The polyurethaneurea of claim 10 wherein said diol is selected from the group consisting of butanediol, ethylene glycol; diethylene glycol; triethylene glycol; 1,2-propanediol; 1,3-propanediol; 1,6-hexanediol; 1,4-bis-hydroxymethyl cyclohexane, and hydroquinone dihyroxyethyl ether.

14. The polyurethaneurea of claim 10 wherein said diamine is selected from the group consisting of ethylenediamine, hexamethylenediamine octamethylenediamine, dodecamethylenediamine, 1,2-phenylenediamine and 2-methylpentamethylenediamine.

15. The polyurethaneurea of claim 10 wherein said reaction further includes a reagent selected from the group consisting of water and a silicone glycol.

16. The polyurethaneurea of claim 10 further including a radiopaque material.

17. A melt processable polyurethaneurea comprising the product from the reaction of a polyisocyanate, macroglycol, diol chain extender and diamine chain extender.

18. The polyurethaneurea of claim 17 wherein said macroglycol is selected from the group consisting of a silicone glycol, a polyester glycol, a polylactone glycol and a polyether glycol.

19. A melt processable polyurethaneurea comprising a product from the reaction of 4,4'-diphenylmethane diisocyanate, polytetramethyleneoxide having a molecular weight of about 500 to 3,000, butanediol and 2-methylpentamethylenediamine.

20. The polyurethaneurea of claim 19 further comprising barium sulfate.

* * * * *